(12) United States Patent
Kageyu et al.

(10) Patent No.: US 6,457,057 B1
(45) Date of Patent: Sep. 24, 2002

(54) SYSTEM FOR DISPLAYING A PLURALITY OF PICTURES AND APPARATUSES INCORPORATING THE SAME

(75) Inventors: Satoshi Kageyu, Fujisawa; Shun Matsuura, Tokyo; Kayoko Asai, Tokyo; Hitoshi Kato, Tokyo; Hiroaki Yoshio, Tokyo; Tsuyoshi Kato, Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/185,597

(22) Filed: Nov. 4, 1998

(30) Foreign Application Priority Data

Nov. 4, 1997 (JP) .............................. 9-301488
Oct. 12, 1998 (JP) ........................... 10-303192

(51) Int. Cl.⁷ ............................................... G06F 15/16
(52) U.S. Cl. ....................... 709/231; 709/232; 348/385
(58) Field of Search ................................ 709/231, 232; 370/352, 389, 259; 348/385, 387, 392, 423, 424

(56) References Cited

U.S. PATENT DOCUMENTS

| | | | |
|---|---|---|---|
| 4,780,709 A | 10/1988 | Randall | |
| 5,189,516 A | 2/1993 | Angell et al. | |
| 5,414,455 A | 5/1995 | Hooper et al. | |
| 5,517,605 A | 5/1996 | Wolf | |
| 5,623,308 A * | 4/1997 | Civanlar et al. | 348/392 |
| 5,631,693 A | 5/1997 | Wunderlich et al. | |
| 5,633,683 A | 5/1997 | Rosengren et al. | |
| 5,691,768 A * | 11/1997 | Civanlar et al. | 348/392 |
| 5,995,146 A * | 11/1999 | Rasmussen | 348/385 |
| 6,181,693 B1 * | 1/2000 | Maresca | 370/352 |

FOREIGN PATENT DOCUMENTS

| | | |
|---|---|---|
| CA | 2244356 | 9/1998 |
| EP | 0494752 | 7/1992 |
| EP | 0534139 | 3/1993 |
| EP | 0702491 | 3/1996 |
| EP | 0740247 | 10/1996 |
| EP | 0805591 | 11/1997 |
| JP | 5-19731 | 1/1993 |

* cited by examiner

*Primary Examiner*—Ayaz Sheikh
*Assistant Examiner*—Oanh L Duong
(74) *Attorney, Agent, or Firm*—Lowe Hauptman Gilman & Berner, LLP

(57) ABSTRACT

A method and system for displaying a plurality of specified ones of pictures in an array of windows provided on a display screen of a computer based system. The size of moving and/or still pictures is reduced into size-reduced pictures with a size of the frames. The size-reduced pictures are coded into coded size-reduced pictures and stored in a hard disc. In response to a predetermined signal and a list of pictures to be displayed, a display frame is compiled from the coded size-reduced pictures specified by said list. The compiled frame is decoded and displayed.

22 Claims, 15 Drawing Sheets

| WINDOW (x, y) | VIDEO ID $P_i$ |
|---|---|
| (1, 1) | $P_i$ |
| (2, 1) | X |
| (3, 1) | P1 |
| ⋮ | ⋮ |
| (X, 1) | X |
| (X+1, 2) | X |
| (X+2, 2) | X |
| (X+3, 2) | PV |
| (X+4, 2) | X |
| ⋮ | ⋮ |
| (X, Y) | X |

| WINDOW (x, y) | VIDEO ID $P_i$ |
|---|---|
| (1, 1) | $P_1$ |
| (2, 1) | $P_2$ |
| (3, 1) | $P_3$ |
| ⋮ | ⋮ |
| (x, y) | $P_i$ |
| (x+1, y) | X |
| ⋮ | ⋮ |
| | X |

| FRAME NO. j | SLICE NO. s | OFFSET FROM THE BEGINNING | SLICE LENGTH $L_{j,s}$ |
|---|---|---|---|
| 1 | 1 | 96 | 38 |
| 1 | 2 | 134 | 40 |
| ⋮ | ⋮ | ⋮ | ⋮ |
| 1 | N | 210 | 37 |
| 2 | 1 | 263 | 37 |
| 2 | 2 | 300 | 106 |
| ⋮ | ⋮ | ⋮ | ⋮ |

SYSTEM FOR DISPLAYING A PLURALITY OF PICTURES AND APPARATUSES INCORPORATING THE SAME

BACKGROUND OF THE INVENTION

1. Field of the Invention

The invention relates to a method and system for displaying an array of reduced-size pictures in a frame and to apparatuses incorporating the same such as a video editing apparatus, a movie or image data base system, a video monitoring apparatus, etc. The displayed pictures may be still pictures, frames of different videos and/or different frames of a single video (A video means a series of moving pictures).

2. Description of the Prior Art

There are a variety of systems that need to display a plurality of pictures at a time. Japanese unexamined patent publication No. Hei5-19731 issued Jan. 29, 1993 discloses a moving picture image display device. In this device, each of the video is encoded in a predetermined format and stored in a hard disc in advance. Displaying a plurality of moving pictures at a time is achieved by decoding only intra-coded frames of a desired moving picture, reducing the size of the decoded frames into an appropriate size, and displaying the reduced-size frames at a time as a single moving picture. The intra-coded frames used for display are frames which have been coded as a still picture by means of DCT (discrete cosine transform) and accordingly can be decoded alone without a need of referring to other frame(s).

However, since each of the frames to be displayed has to be decoded in this scheme, if a larger number of frames are to be displayed at a time, the scheme requires more decoders or a faster decoder. Also, it takes a significant time to display a plurality of pictures because the operations of reduction and decoding are performed each time of display.

It is therefore an object of the invention to provide a system and method for displaying an array of desired pictures from available moving and/or still pictures at a time with a single decoder by reducing the size of the available moving and/or still pictures before encoding them.

SUMMARY OF THE INVENTION

According to the invention, a method of displaying a plurality of specified ones of pictures in an array of windows provided on a display screen of a computer based system is provided. The method comprises the steps of reducing in size the pictures into size-reduced pictures with a size of the frames; coding the size-reduced pictures into coded size-reduced pictures; storing the coded size-reduced pictures in a mass storage device; in response to a predetermined signal and a list of pictures to be displayed, compiling a frame comprising coded size-reduced pictures specified by the list; decoding the compiled frame for display.

BRIEF DESCRIPTION OF THE DRAWING

Further objects and advantages of the present invention will be apparent from the following description of the preferred embodiments of the invention as illustrated in the accompanying drawing, in which:

FIG. 7 is a diagram showing an exemplary output video map in case of the size-reduced videos to be displayed being arranged as shown in FIG. 6;

FIG. 8 is a diagram showing another exemplary output video map in case of the size-reduced videos to be displayed being arranged sequentially in windows (1, 1), (2, 1), ..., (X, 1), (1, 2) and so on;

FIG. 9 is a diagram showing a temporal correlation between the compiled frames Fk (k=1, 2, ...) and the frames $F_{ij}$ (j=1, 2, ...) of a video with a higher frame rate Ri;

FIG. 13 is a diagram showing an exemplary structure of a preferable output video;

Throughout the drawing, the same elements when shown in more than one figure are designated by the same reference numerals.

DETAILED DESCRIPTION OF THE PREFERRED EMBODIMENTS

Figure 1:
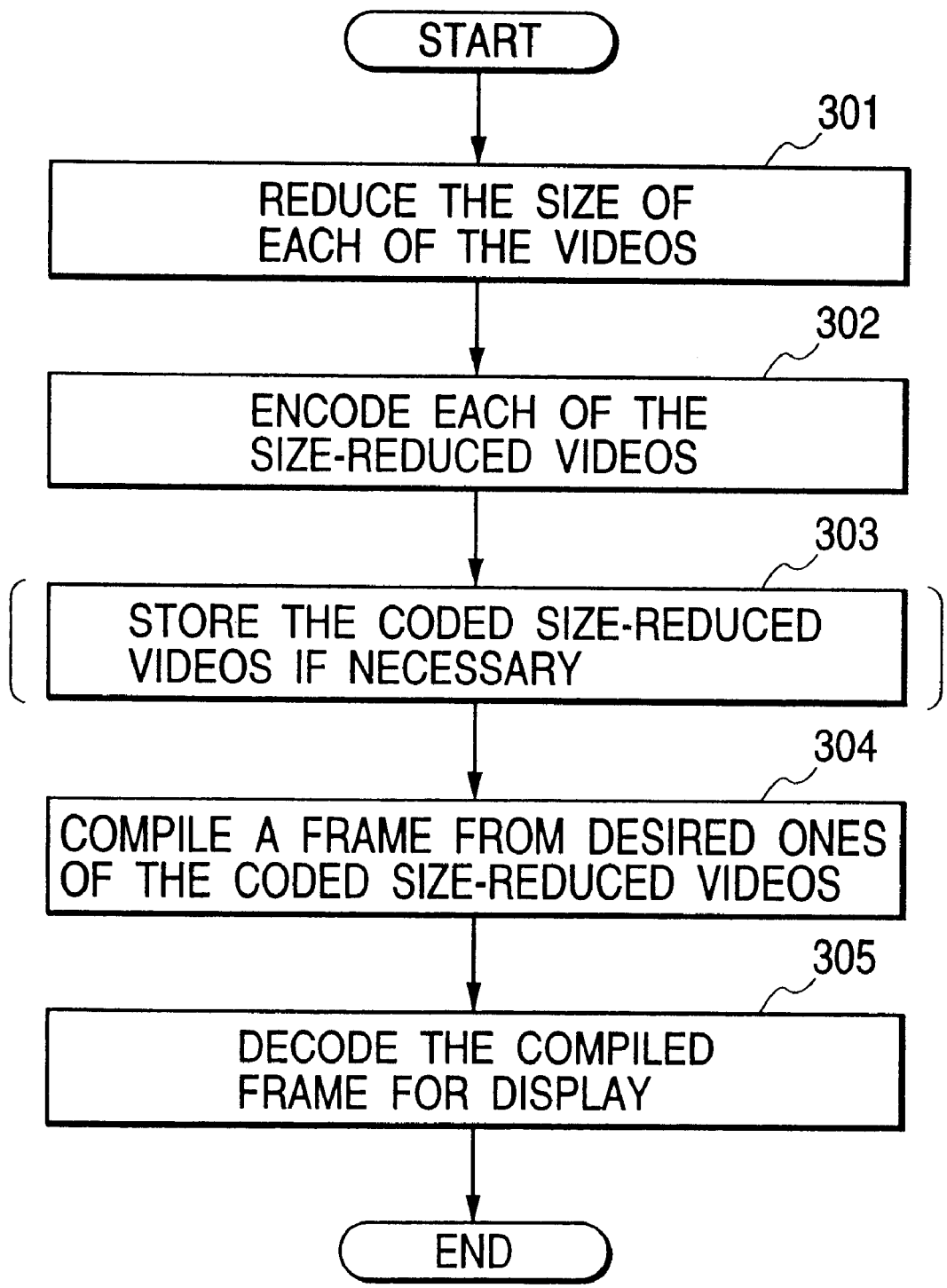
FIG. 1 is a flow chart showing a basic concept of a method for displaying a plurality of videos or moving pictures at a time in accordance with the principles of the invention.
Figure 2:
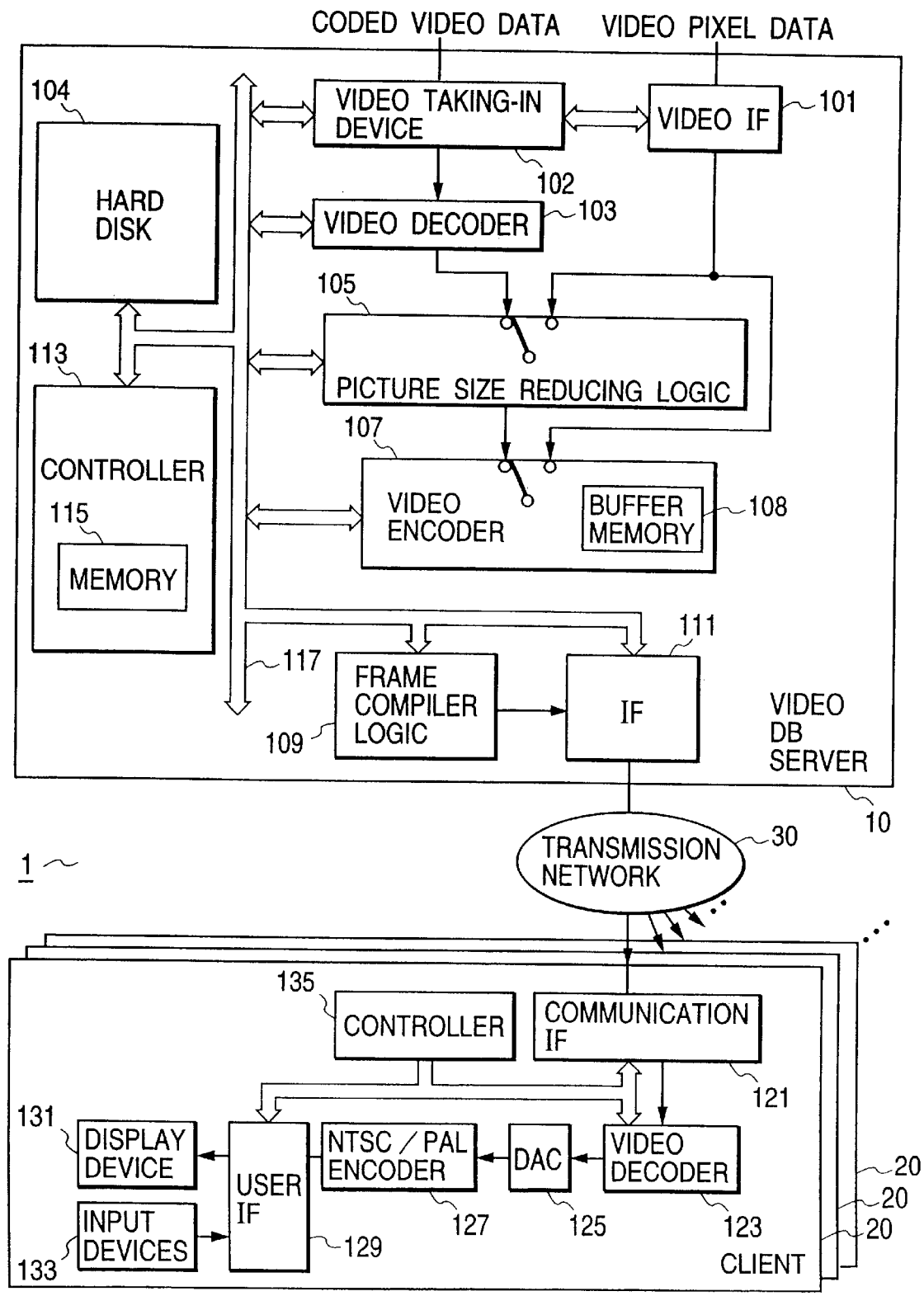
FIG. 2 is a schematic block diagram showing a client-server video (moving picture) data base system that incorporates an illustrative embodiment of the invention.

FIG. 2 is a schematic block diagram showing a client-server video (moving picture) data base (DB) system 1 that incorporates an illustrative embodiment of the invention. The video data base system comprises:

a video database server 10 which collects and manages a variety of videos;

a plurality of client terminals 20 which permit the users to retrieve desired videos from the video data base server 10; and a transmission network 30 through which the video database server 10 and the client terminals 20 communicates with each other.

The transmission network 30 may be a LAN (local-area network) comprising a high-speed data transmission system such as an Ethernet (the IEEE 802.3 standard), a token-ring network, etc or a WAN (wide-area network) that enables communications in a relatively large geographical area through telephone lines or radio waves.

In order to take in video data, the video DB server 10 at least comprises either a video interface (IF) 101 for taking in video pixel data or a combination of a video taking-in device 102 such as an optical disc drive for replaying an optical disc to taking in coded video data and a video decoder 103 for decoding the taken-in coded video data into video pixel data. It is assumed that the server 10 has both of them. The server 10 further comprises:

a hard disc 104 for storing various programs and data including coded videos;

a picture size reducing logic 105 for reducing the size of the video pixel data from the video decoder 103 or the video interface 101 into an appropriate size, i.e., an X-th in width and a Y-th in height, respectively, where M and N are appropriate natural numbers;

a video encoder 107 for encoding the size-reduced video data from the picture size reducing logic 105 into a coded size-reduced video for display, which is then stored in the hard disc 104, and for encoding the video pixel data from the video IF 101 into a full size coded video for offering as actual video data in response to a final or formal request from a client 20, which video is then stored in the hard disc 104;

a frame compiler 109 for compiling a frame comprising an array of coded videos from desired ones of the coded size-reduced videos stored in the hard disc 104;

a communication interface 111 for receiving service requests from the clients 20 and for transmitting the compiled frame of coded size-reduced videos and a formally requested full-size coded video to the clients 20 through the transmission network 30;

a controller 113 for controlling the whole video DB server 10; and a system bus 117 for interconnecting the above mentioned elements.

The controller 113 comprises a not-shown CPU (central processing unit), a not-shown read only memory and RAM (random access memory) 115 as is well known in the art. It is noted that if the server 10 is provided with the video IF 101, then the video encoder 107 is so arranged as to be available for both of a size-reduced video and a full size video.

The client terminal 20 comprises:

a communication interface (IF) 121 for communicating with the video DB server 10;

a video decoder 123 for decoding a received frame of coded size-reduced videos from the communication IF 121 into a frame of digital video data;

a digital-to-analog converter (DAC) 125 for converting the frame of digital video data into a frame of analog video data;

an NTSC/PAL (National Television Standard Committee/ Phase Alternation by Line) encoder 127 for encoding the frame of analog video data into an ITSC or PAL format;

a controller 135 for controlling the operation of the video decoder 123;

a user interface 129 for providing the controller 135 with an interface with the user;

a display device 131 connected with the user IF 129 for displaying the frame of size-reduced videos; and input devices 133 such as a keyboard, a mouse, etc. The controller 135 comprises a not-shown CPU (central processing unit), a not-shown read only memory and a not-shown random access memory as is well known in the art.

Figure 3:
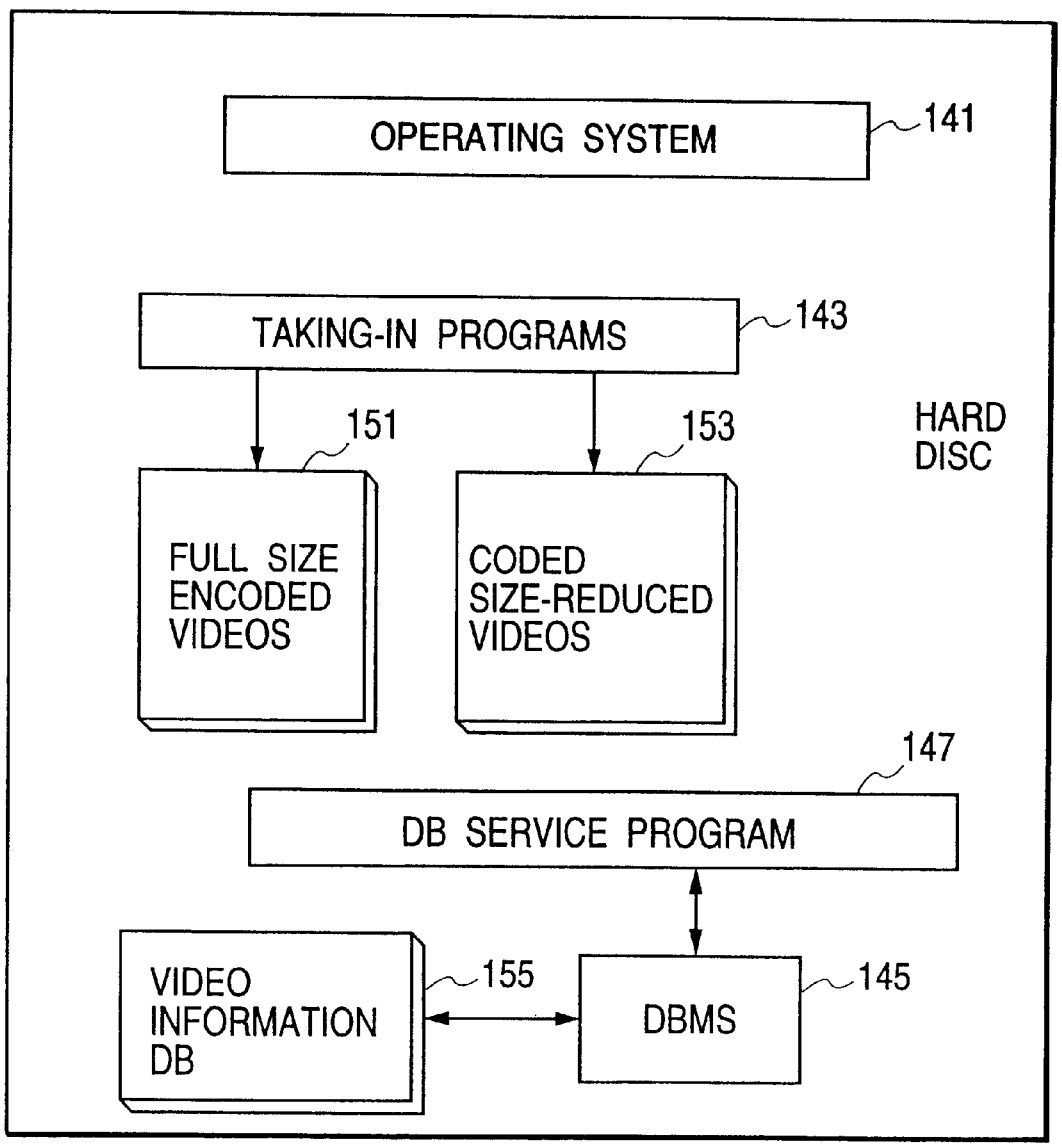
FIG. 3 is a diagram showing exemplary contents of the hard disc of FIG. 2.

FIG. 3 shows exemplary contents of the hard disc 104 of FIG. 2. In FIG. 3, single line boxes indicate programs, and shaded boxes indicate data. The hard disc 104 stores:

an operating system 141;

taking-in programs 143 for taking in the coded video data and the video pixel data through the taking-in device 102 and the video IF 101, respectively;

full-size encoded videos 151 which have been taken in through the video taking-in device 102 or through the video IF 101 and the video encoder 107;

coded size-reduced videos 153 or reduced-size versions of the encoded videos 151 which have been taken from the video encoder 107;

a video information DB (data base) 155 comprising information on the videos 151;

a DBMS (data base management system) 145 for managing the video information DB 155; and a DB service program or main program 147 for receiving a service request from one of the clients 20 and offering information obtained with a help of the DBMS 155 to the requesting client 20.

The jobs of the video DB server 10 are roughly classified into two categories, i.e., a collection and maintenance of videos and a retrieval service of the collected videos for the clients 20, which involve a preprocess for preparing a coded size-reduced version of a taken-in full-size video and a compile process for compiling a frame of coded video data from coded size-reduced versions of retrieved videos from the viewpoint of the invention. So, we discuss the video taking-in operation and the retrieval service operation centering on the preprocess and the compile process in the following.

If a video to be taken in is a coded one, the coded video is taken in via video taking-in device 102 and stored in hard disc as a full size encoded video 151. In order to reduce the size of the taken-in coded video, the taken-in coded video is once decoded by the video decoder 103 into a frame of digital video data and then passed to the picture size reducing logic 105.

If a video to be taken in is in a YIQ format (which is a combination of a luminance (Y) signal and two weighted color-difference signals I and Q (in-phase and quadrature)) such as NTSC or PAL, the YIQ format video is converted by the video IF 101 into a frame of digital video data, and then passed not only to the picture size reducing logic 105 but also to the video encoder 107. The frame of digital video data from the video IF 101 is encoded by the video encoder 107 into a encoded video, which is then stored in the hard disc 104 as a full size encoded video 151.

The picture size reducing logic 105 reduces the size of the frame of the digital video data into one X * Y-th of the frame, i.e., into an X-th in width and a Y-th in height, of the frame. It is assumed that retrieved videos are displayed as an array of X-by-Y sized-reduced pictures on the display device 131 of the client 20.

The size-reduced video is then encoded by the video encoder 107 and stored in the hard disc 104 as a coded size-reduced video 153.

Figure 4:
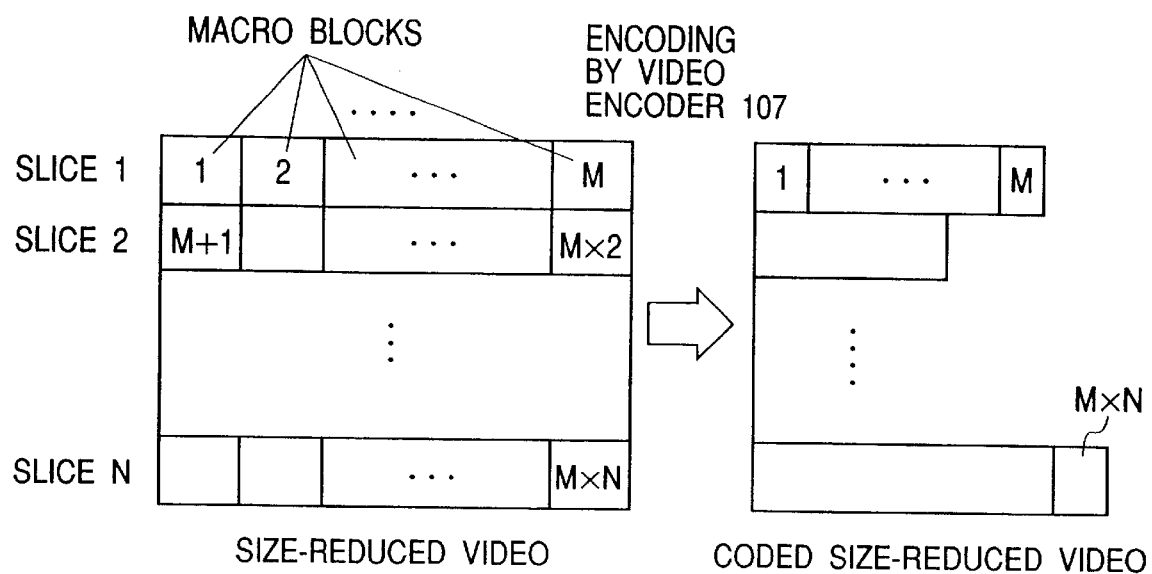
FIG. 4 is a diagram showing how a coding operation causes the fixed-length slices of a size-reduced video to become variable in length.

In the video encoder 107, the input size-reduced video is temporarily stored in a buffer memory 108. If a full size frame can be divided into M'* N' macroblocks (M' slices), the size-reduced video stored in the buffer 108 is divided into M * N macroblocks as shown in FIG. 4, where M=M'/X and N=N'/Y. If a full size frame comprises 40 * 32 macroblocks (32 slices) for example and if retrieved videos are to be displayed in an array of 8-by-8 sized-reduced pictures, then each frame of the size-reduced pictures is divided into 5(=40/8)* 4(=32/8) macroblocks (4 slices). Each of the macroblock comprises 2 by 2 blocks, each of which comprises 8 by 8 pixels.

The video encoder 107 performs a well-known encoding operation on each block of each of the macroblocks. Since a variable length coding is performed at the end of the encoding operation, the lengths of blocks are variable, and accordingly the lengths of slices are also variable.

Figure 5:
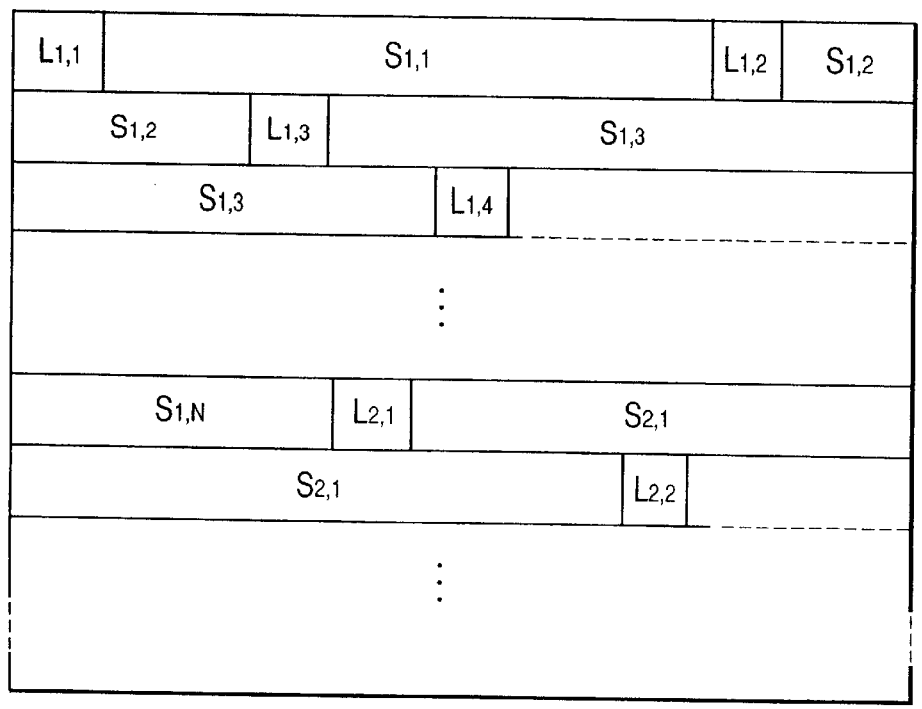
FIG. 5 is a diagram showing the way in which a coded size-reduced video is stored in the hard disc 104.

For this reason, each of the coded size-reduced videos 153 is stored in a format as shown in FIG. 5 in this specific embodiment. Specifically, assuming that each coded size-reduced video 153 comprises frames $\{F_j: j=1, 2, \ldots\}$, each frame $F_j$ comprises slices $\{S_{j,k}: k=1, 2, \ldots N\}$ and the length of each slice $S_{j,k}$ is denoted by a fixed-length length code $L_{j,k}$ (bytes), then the slices of each coded size-reduced video, $S_{1,1}S_{1,2}\ldots, S_{1,N}, S_{2,1}, S_{2,2}, \ldots$ are stored each headed by a fixed-length length code $L_{j,k}$. Doing this enables an efficient read out of slice data from each coded size-reduced video file 153. Thus, the coded size-reduced videos are prepared for multiple display at a time.

If the video DB server 10 receives a video retrieval request with a query expression, then the server 10 passes the query expression to the DBMS. In response to a reception of a list of retrieved video IDs, the server 10 compiles a frame of coded videos from the coded size-reduced videos identified by the retrieved video IDs. The compiling process will be described in the following.

Figure 6:
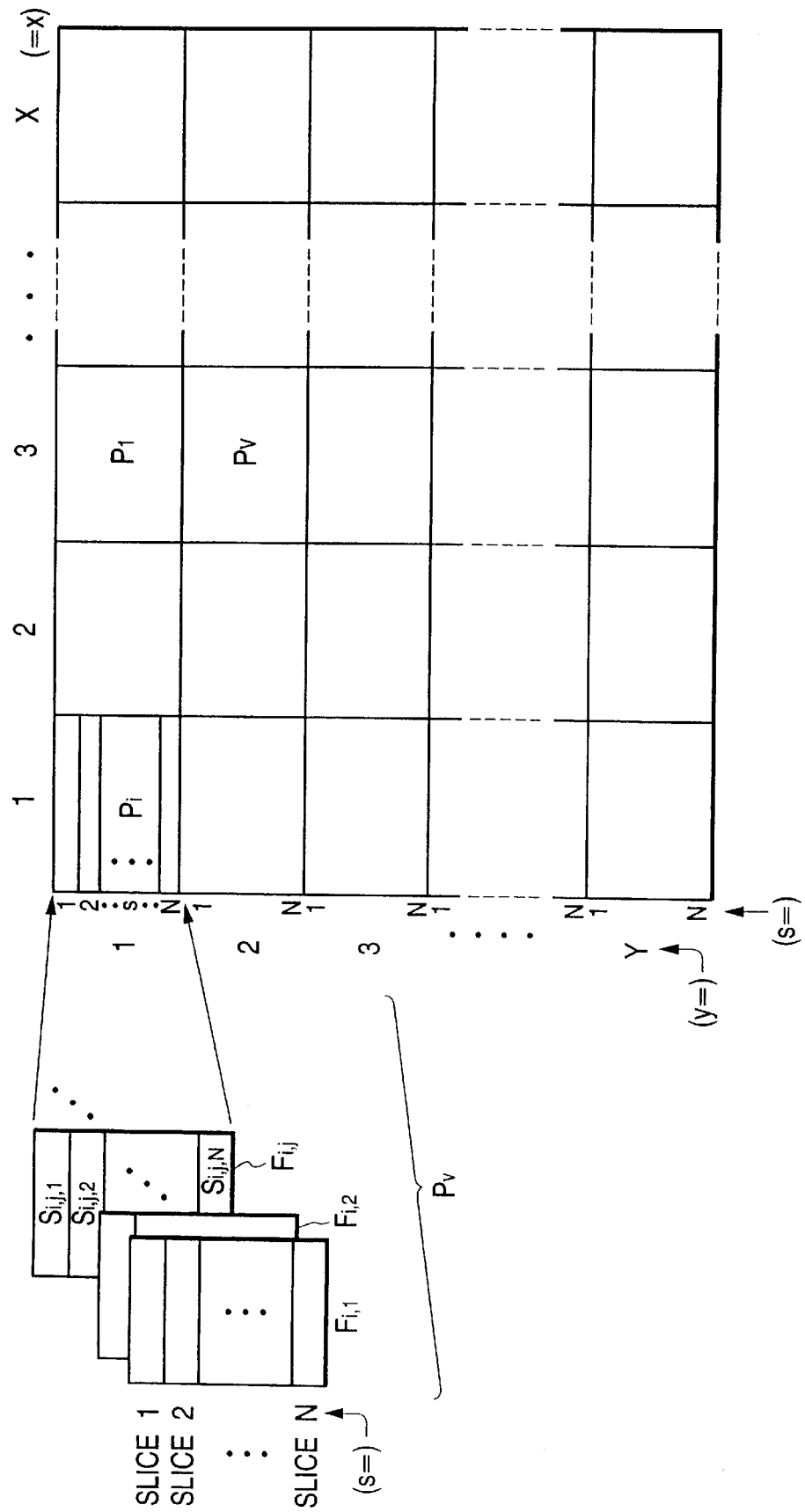
FIG. 6 is a diagram showing how desired size-reduced pictures are displayed in an array of windows.
Figures 7, 8, 9:
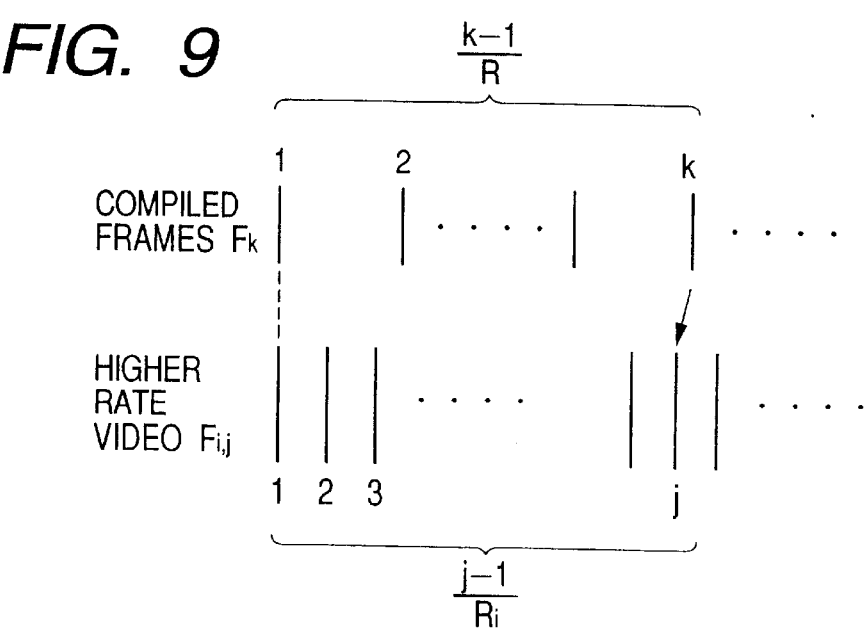

FIG. 6 is a diagram showing how desired size-reduced pictures are displayed in an array of windows. As shown in FIG. 6, the display screen is divided into X*Y windows $\{W_{X,Y}: x=1, 2, \ldots X \text{ and } y=1, 2, \ldots Y\}$. Each of the rows of windows comprises N slices (N is the number of slices that constitute a size-reduced video). Assuming that the IDs of the coded size-reduced videos to be displayed is given as $\{Pi: i=1, 2, \ldots, V \text{ and } V \leq X*Y\}$, the controller 113 first assigns the videos P1, P2, . . . PV to desired respective windows as shown in FIG. 6. The assignment of the videos P1, P2, . . . PV may done in any geometric pattern. Then, the controller 113 generates an output (or display) video map according to the assignment. FIG. 7 shows an exemplary output video map in case of the videos to be displayed, P1, P2, . . . PV, being arranged as shown in FIG. 6; and FIG. 8 shows another exemplary output video map in case of the videos P1, P2, . . . PV being arranged sequentially in windows (1, 1), (2, 1), . . . ,(X, 1), (1, 2) and so on.

On the other hand, each video Pi comprises frames $\{F_{i,j}=1, 2, .3 \ldots\}$. After deciding the correspondence between each coded size-reduced video Pi and the window (x, y) where the video Pi is to be displayed, the controller 113 directs the frame compiler logic 109 to begin compiling a frame.

It is assumed that the frame rates of the displayed videos P1, P2, . . . PV are R1, R2, . . . RV (frames/sec), the frame compiler logic 109 compiles frames $\{Fk: k=1, 2, 3 \ldots\}$ at a rate of R frames/sec. The frame rate of the compiled frames, R, is preferably in the range from the minimum rate to the maximum rate of the videos P1, P2, . . . PV. In compiling each frame, the frame compiler logic 109 selects suitable frames Fi,j from the videos P1, P2, . . . PV in the following manner.

FIG. 9 is a diagram showing a temporal correlation between the compiled frames Fk (k=1, 2, . . . ) and the frames $F_{ij}$ (j=1, 2, . . .) of a video with a higher frame rate Ri. In FIG. 9, the frame number of the video Pi which is to be used for the compiled frame Fk is given as the maximum integer j that satisfies the relationship:

$$(k-1)/R = (j-1)/Ri$$

Thus, $$j = [(Ri/R)*(k-1)]+1,$$

where [A] indicates the maximum integer not greater than A.

Figure 10:
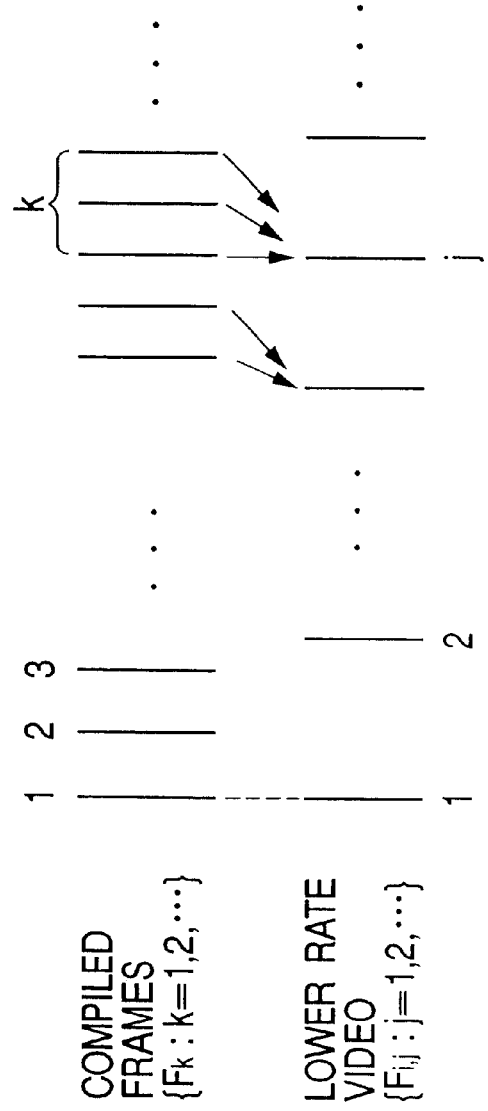
FIG. 10 is a diagram showing a temporal correlation between the compiled frames Fk (k=1, 2, ...) and the frames $F_{ij}$ (j=1, 2, ...) of a video with a lower frame rate Ri.

FIG. 10 is a diagram showing a temporal correlation between the compiled frames Fk (k=1, 2, . . . ) and the frames $F_{ij}$ (j=1, 2, . . . ) of a video with a lower frame rate Ri. As seen from FIG. 10, the frame number k of the compiled frame Fk and the frame number j of the video Pi which is to be used for the compiled frame Fk are integers that satisfy the following relation:

$$(1/Ri)*(j-1) \leq (1/R)*(k-1) < (1/Ri)*j.$$

Solving this with respect to j gives $$(Ri/R)*(k-1) < j < (Ri/R)*(k-1)+1.$$

Since a frame number j is integer, we again obtain $$j = [(Ri/R)*(k-1)]+1.$$

Thus, the compiled frames Fk (k=1, 2, . . . ) can be displayed at any desired rate by selecting from the videos P1, P2, . . . PV frames Fi,j (I=1, 2, . . . V) identified by $$j = [(Ri/R)*(k-1)]+1 \qquad (1)$$

for each frame Fk regardless of the frame rates of the videos.

Figure 11:
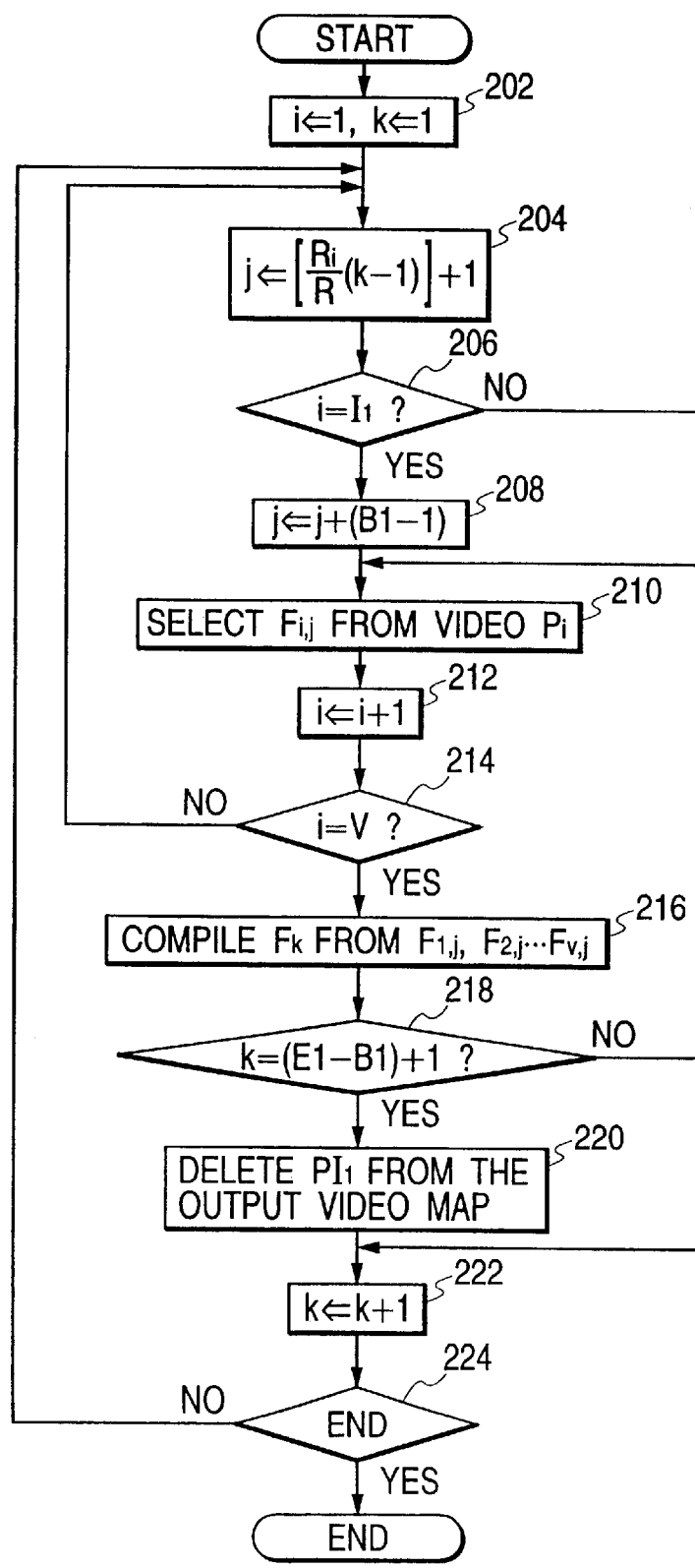
FIG. 11 is a flow chart showing an exemplary operation of displaying a plurality of videos of various frame rates at a time in accordance with the principles of the invention.

FIG. 11 is a flow chart showing an exemplary operation of displaying a plurality of videos of various frame rates at a time in accordance with the principles of the invention. After creating the output video map, the controller 113 enters the operation of FIG. 11. In step 202, the compiled frame number k and the number "i" of a first video to be included in the frame Fk are set to 1. In step 204, set the frame number j of the video P1 according to equation (1).

Figure 12:
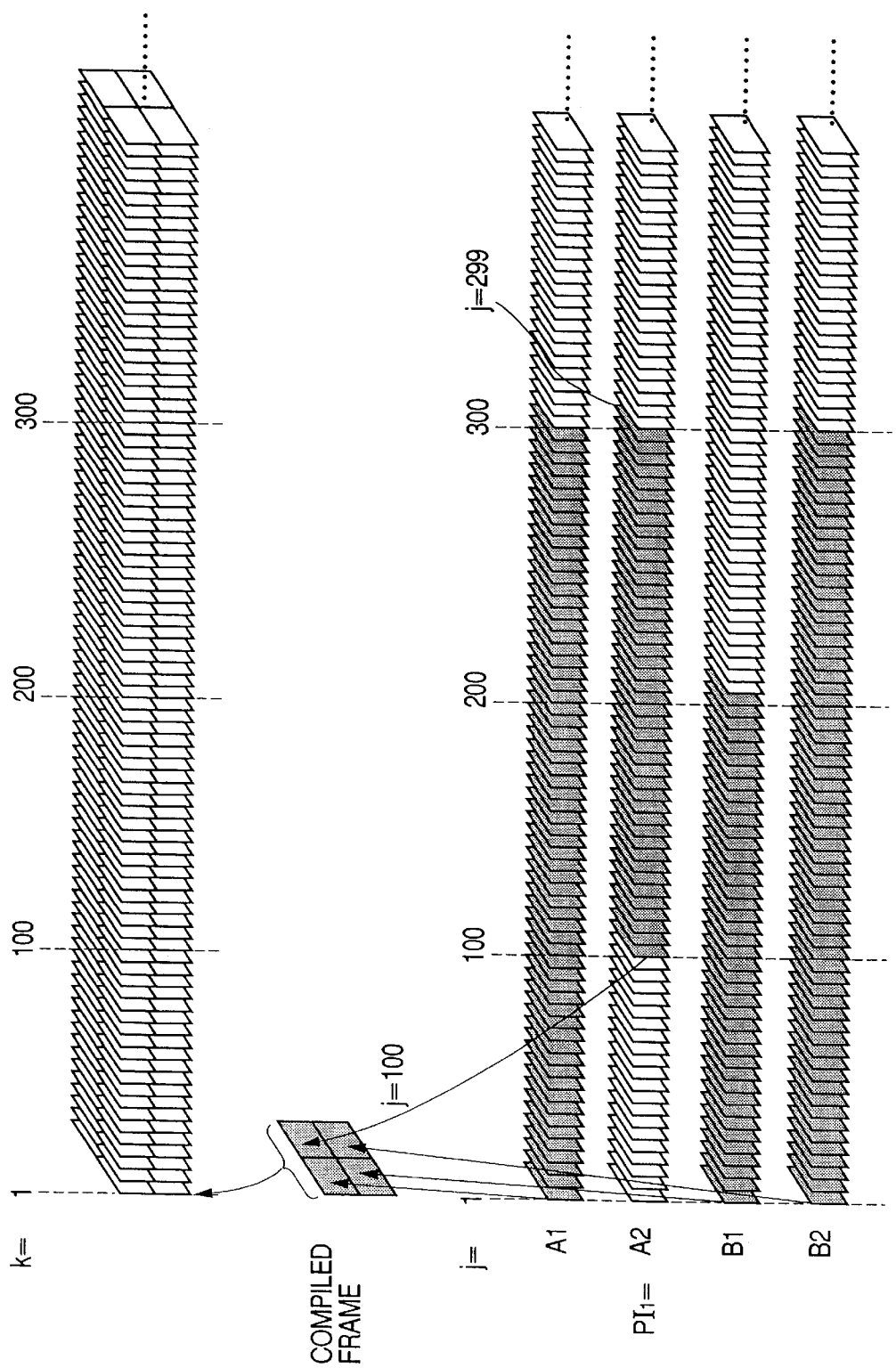
FIG. 12 is a diagram showing an exemplary operation of displaying a plurality of videos including a video to be displayed only for frame numbers 100 through 299.

In step 206, a test is made to see if the video is a specific one P1, that is to be displayed from a desired frame No. B1. If so, then a value (B1-1) is added to the frame number j of the video $PI_1$ in step 208. It may be desirable to display only limited frames as shown in FIG. 12. In FIG. 12, the video $PI_1$=A2 is to be displayed only from frame No. 100 through 300, while the other videos A1, B1 and B2 are to be displayed from the beginning of the videos. In case of video A2, a value (100-1) is added to the frame number j in step 208. If there is another video to be displayed from a frame other than the first frame, a pair of steps like 206 and 208 is inserted in the "NO" path from step 206 to step 210 for such video, which is repeated till all of such videos are exhausted. In order to achieve this systematically, it is preferable to add the fields of the start frame number $F_{i,Bi}$ and the end frame $F_{i,Ei}$ for display to the display video map as shown in FIG. 13 and insert a pair of steps like 206 and 208 for a video with a value in the start frame field of the output video map.

In step 210, a frame of thus decided frame number is selected for the video Pi. The video ID number i is incremented in step 212. A test is made in step 214 to see if the videos have been exhausted. If not, the control is returned to 204. If the test result is YES in step 214, then the controller 113 directs the frame compiler logic 109 to compile a frame Fk from the selected frames $F_{1j}$, $F_{2j}$, ... $F_{vj}$ in step 216 (the compile operation by the frame compiler logic 109 will be detailed later).

In step 218, a test is made to see if the compiled frame number k is equal to (E1−B1)+1, where E1 is a last frame number to be displayed for the specific video $PI_1$ (=A2 in this example). If so, the controller 113 deletes the ID of the video $PI_1$ from the output video map in step 220 because there is no need of displaying the video $PI_1$ any more. In case of A2 of FIG. 12, if k=(299−100)+1=200 in step 218, the video A2 is deleted from the output video map, which causes the frame $F_{f1,201}$ and the subsequent frames to be displayed no more. If there is another video to be displayed only for the frames from frame number B2 to E2, a pair of steps like 218 and 220 is inserted in the "NO" path from step 218 to step 222 for such video, which is repeated till all of such videos are exhausted. In order to achieve this systematically, it is preferable to insert a pair of steps like 218 and 220 for a video with a value in the end frame field of the output video map.

In step 222, the compiled frame number k is incremented. In step 224 a test is made to see if the multiple video display operation is to be continued. This test may be made in various ways, for example, by comparing the compiled frame number, the elapsed time from the beginning of the display operation, or the frame number of specific video with a preset value or by checking if a stop instruction has been issued. If not, the controller is passed to step 204. If the test result is YES in step 224, the controller 113 ends the operation. In this way, the video DB server 10 enables a plurality of videos of various frame rates to be displayed at a time at any desired speed.

Figure 14:
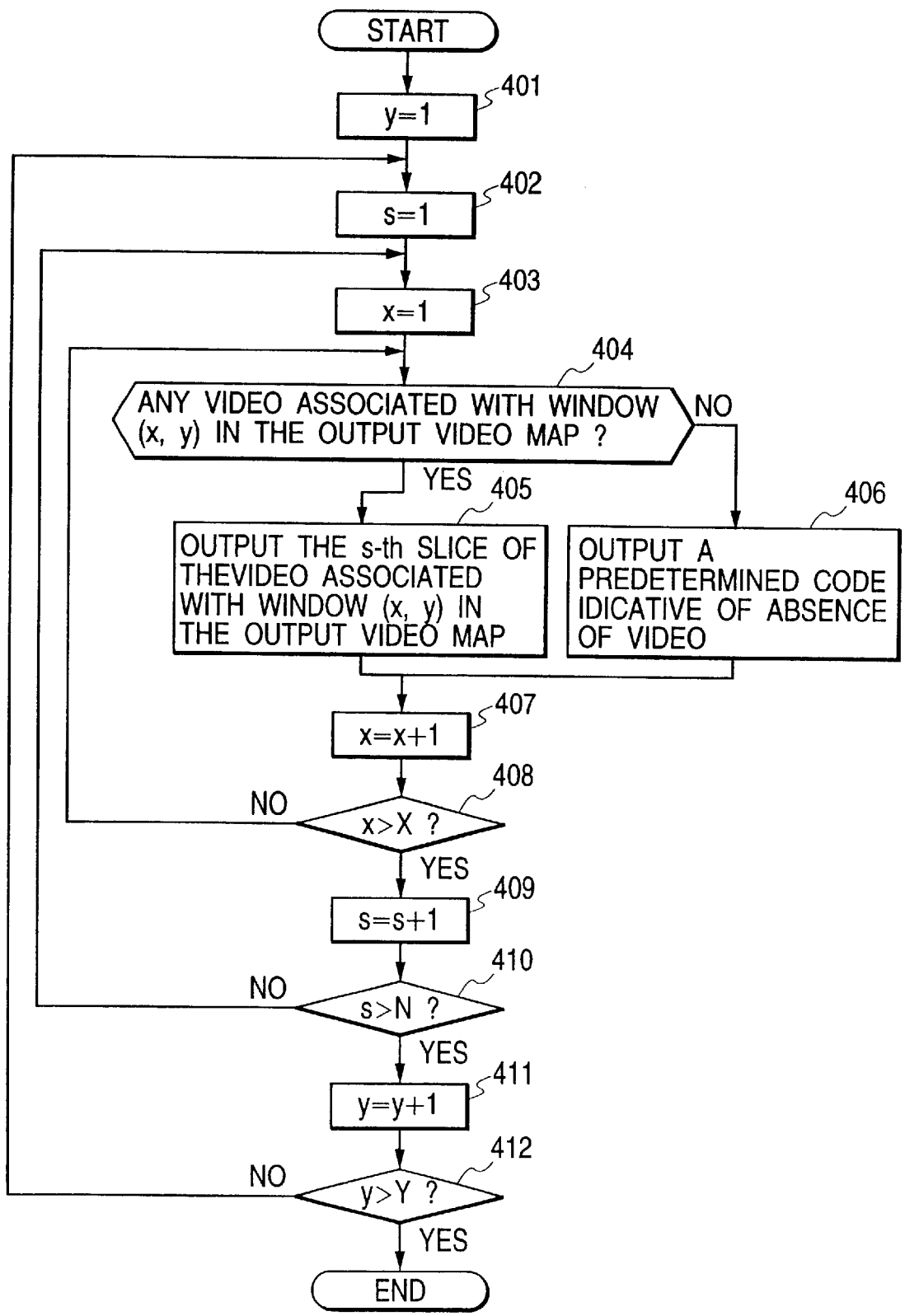
FIG. 14 is a flow chart showing an exemplary operation in which the frame compiler logic 109 compiles a display frame Fk from the selected frames $F_{1j}, F_{2j}, \ldots F_{vj}$ in response to the direction from the controller 113.

FIG. 14 is a flow chart showing an exemplary operation in which the frame compiler logic 109 compiles a display frame Fk from the selected frames $F_{1j}$, $F_{2j}$, ... $F_{vj}$ in response to the direction from the controller 113. In FIG. 13, the compiler logic 109 first sets the y coordinate of the current window to 1 in step 401, sets the slice number s in the window row for y=1 to 1 in step 402, and sets the x coordinate of the current window to 1 in step 403.

In step 404, the compiler logic 109 makes a test to see if any video is associated with a window (x, y) in the output video map. If so, the logic 109 output the s-th slice $S_{i,j,s}$ of the selected frame $F_{ij}$ of the video associated with the window (x, y). Otherwise, the logic 109 outputs a predetermined code indicative of the absence of video in step 406. Referring to FIGS. 6 and 7, we Specifically discuss this matter. If (x, y)=(2, 1) in FIG. 6, since no video is associated with the window in FIG. 7 in step 404, the compiler logic 109 outputs the predetermined code. If (x, y)=(3, 1), since a video P1 is associated with the window in FIG. 7 in step 404, the compiler logic 109 outputs the first slice $S_{1,j,1}$ of the selected frame $F_{1,j}$ of the video P1 associated with the window (3, 1). In this case, the frame number j to be output is given as:

$$j=[(R1/R)*(k-1)]+1.$$

according to equation (1). If k=1, then j=1. That is, the logic 109 searches a P1 file for the length code of the first slice of the first frame, $L_{1,1,1}$, and outputs the data of $L_{1,1}$ in length which data follows the length code $L_{1,1}$.

In step 407, the x coordinate is incremented. In step 407, a test is made to see if x>X. If so, the logic 109 returns to step 404. Otherwise, the logic 109 proceeds to step 409, where the slice number s is incremented. In step 410, a test is made to see if s>N or if the slices in the window has been exhausted. If so, the y coordinate is incremented in step 411. Otherwise, the control is passed to step 403. In step 412, a test is made to see if y>Y. If not, the control is passed to step 402. If y>Y in step 411, then the compiler logic 109 ends the operation. In this way, a compiled frame including frames from the videos P1, P2, ... PV are transmitted to the requesting client 20. Thereafter, each time the controller 113 executes the step 216 of FIG. 11 for the subsequent display frames F2, F3, ... the compiler logic 109 executes the operation of FIG. 14.

In response to a reception of the compiled frame Fk, The requesting client 20 decodes, analog-to-digital converts and NTSC/PAL encodes the received compiled frame Fk with the element 123, 125 and 127 to display an array of size-reduced videos identified by the retrieved video IDs.

By using the output video map, the size-reduced videos may be arranged in any desired pattern on the window array shown in FIG. 6. The sizes of the displayed size-reduced videos has not necessarily to be the same. One or more videos may be doubled or tripled in horizontal and/or vertical dimension.

It is also noted that the displayed pictures has not necessarily to be from different videos. Instead, some or all of the displayed pictures may be from an identical video.

In the above-described embodiment, the coded size-reduced videos 153 are stored with the slice length code $L_{j,s}$ as shown in FIG. 5. Alternatively, the slices $S_{j,s}$ of a video Pi may be obtained referring to slice information generated by the video decoder.

Embodiment II

Figures 15, 16:
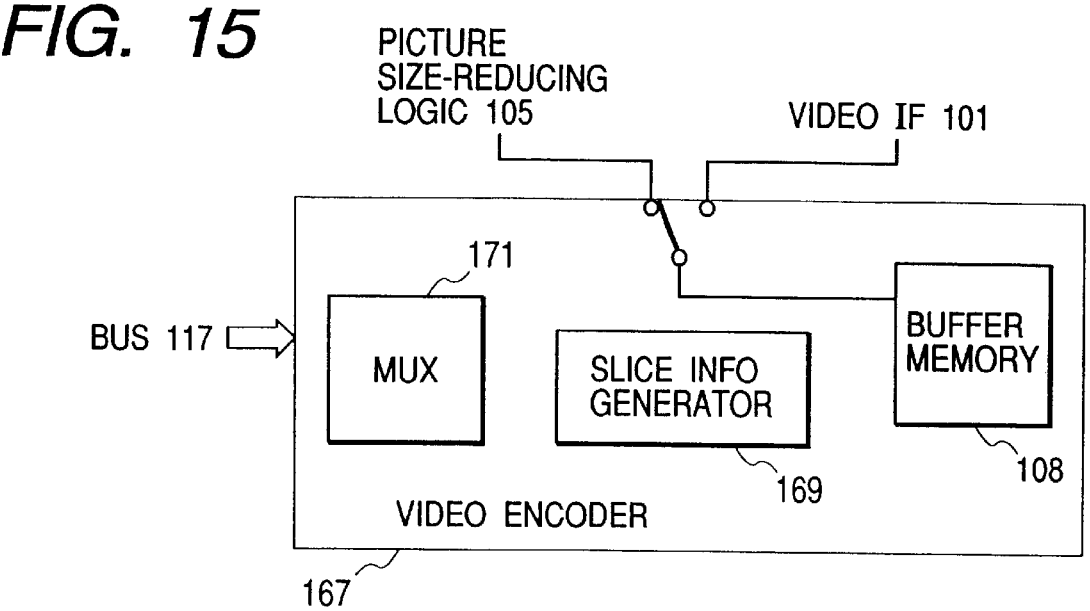
FIG. 15 is a schematic block diagram showing a video encoder used in a video DB server in accordance with a second embodiment of the invention.
FIG. 16 is an example of a slice information table 180 generated by the slice INFO generator 169 at the time of encoding the size-reduced video Pi.
Figure 17:
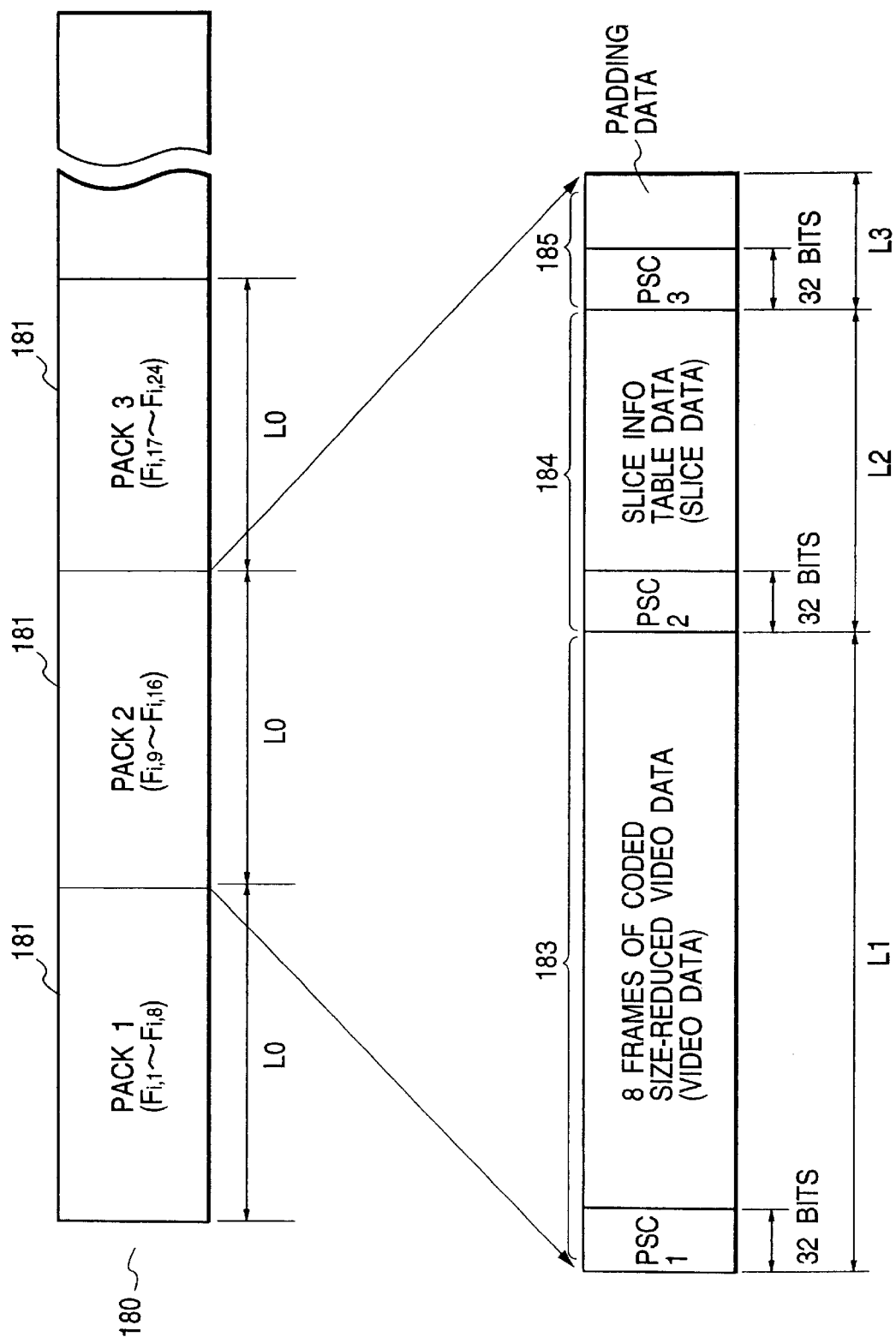
FIG. 17 is a diagram showing an example of a multiplexed coded size-reduced video data stream generated by the video encoder of FIG. 15.

FIG. 15 is a schematic block diagram showing a video decoder 167 used in a video DB server in accordance with a second embodiment of the invention. In FIG. 15, the video encoder 167 further comprises a slice information (INFO) generator 169 through witch a desired slice $S_{j,s}$ of a video Pi can be obtained and a multiplexer (MLUX) 171 for mutiplexing the coded sized-reduced video Pi data, corresponding slice INFO and stuffing bits as detailed later.

FIG. 16 is an example of a slice information table 180 generated by the slice INFO generator 169 at the time of encoding the size-reduced video Pi. Each record of the table 169 contains a frame number j 181, a slice number s 183, an offset 185 from the beginning of the Pi file 153, and a slice length $L_{j,s}$ 187. It is noted that the offset for the first slice (s=1) of the first frame (j=1) is not zero in value because there are various data such as headers before the first slice information. A slice INFO table 169 for a video Pi are preferably stored in association with a corresponding video file Pi, for example, by giving the same name to the table but differentiating the file name extension.

When a slice $S_{j,s}$ is to be used, the frame compiler logic 109 uses the offset 185 and the slice length 187 associated with j and s instead of using the slice length of FIG. 5.

In order to enable the full size encoded videos and the coded size-reduced videos to be decoded by a standard decoder such as an MPEG (Moving Picture Experts Group) decoder, it is preferable to use such a standard encoders for the encoder 167 and the same standard decoder for the decoder 103 and 123 of FIG. 2.

For this purpose, the multiplexer (MUX) 171 preferably generates a multiplexed data stream 180 as shown in FIG.

17. The stream 180 comprises a series of packs. In this specific example, each pack comprises a video data part 183 containing 8 frames of coded sized-reduced video data, slice table data part 184 containing slice information for the eight frames. Each pack may further includes a padding data part 185 to make the packs constant in length. It is assumed that each pack including the padding data part 187 causes the length of each pack to be L0 bytes and that the lengths of the three parts 183–185 are L1, L2 and L3, respectively.

The three parts 183–185 begin with 32-bit packet start codes PSC1, PSC2 and PSC3, respectively. Each packet start code comprises a 24-bit fixed value code and an 8-bit ID code for identifying the subsequent data.

The length L1 equals 32 bits plus the length of 8 frames of coded sized-reduced video data.

$$L2=(Lpi+Lsl)*N*FN+3 \text{ bytes},$$

where Lpi is a length of the position information of a slice, Lsl is a length of the slice length, N is the number of slices constituting a coded video, FN is the number of frames in a pack (8 in this example). If Lpi and Lsl are 4 bytes, then L2=64N+3 bytes.

$$L3=L0-(L1+L2)$$

Thus, the multiplexer 171 actually outputs padding data of the length equal to L3−3 bytes, i.e., L0−(L1+L2+3) bytes.

The controller 113 and the frame compiler logic 109 uses the data following the start code PSC1 as 8 frames of coded sized-reduced video data and the data following the code PSC2 as the slice table 180 data for the 8 frames and neglects the data following the code PSC3.

If we assume that the multiplexed data stream 180 is an MPEG bit stream, each pack is a PMEG system pack, each video data part is a video packet. The ID code in the packet start code PSC1 can take a value E0 through EFH (H denotes a hexadecimal). The ID codes in the packet start codes PSC2 and PSC3 is preferably set to BFH to deal with the slice data part and the padding data part as Private 2 packets defined in the MPEG standard. If the multiplexer 171 is so arranged as to generate a multiplexed bit stream or Pi bit stream that includes the codes necessary as a pack header and a system header, it enables the multiplexed coded size-reduced video data stream, which include the slice table data for use in frame compiling, to be decoded by an ordinary MPEG decoder. It is also possible to arrange the multiplexed coded video bit stream such that the multiplexed coded bit stream is in an AVI (Audio Visual Interleaved) format or in a DV (DVCPRO) format.

A method of obtaining a frame from the Pi bit stream will be described in the following. Assume that a frame 100 (=j), i.e., $F_{i,100}$, is to be obtained.

Since each pack contains 8 frames, the pack number Np of the pack containing the frame j is given as:

$$Np=<j/8>=13$$

where <A> indicates a minimum integer not smaller than A. Thus, the frame compiler logic 109 reads L0 bytes of data following L0*(13−1) (=12*L0) bytes that start with the beginning of the Pi bit stream 180. If we assume L0 to be 8192, then the logic 109 reads 8192 bytes of data following 106496 (=12*8192) bytes that start with the beginning of the bit stream 180. By using slice data, any slice can be read.

Modification I

Figure 18:
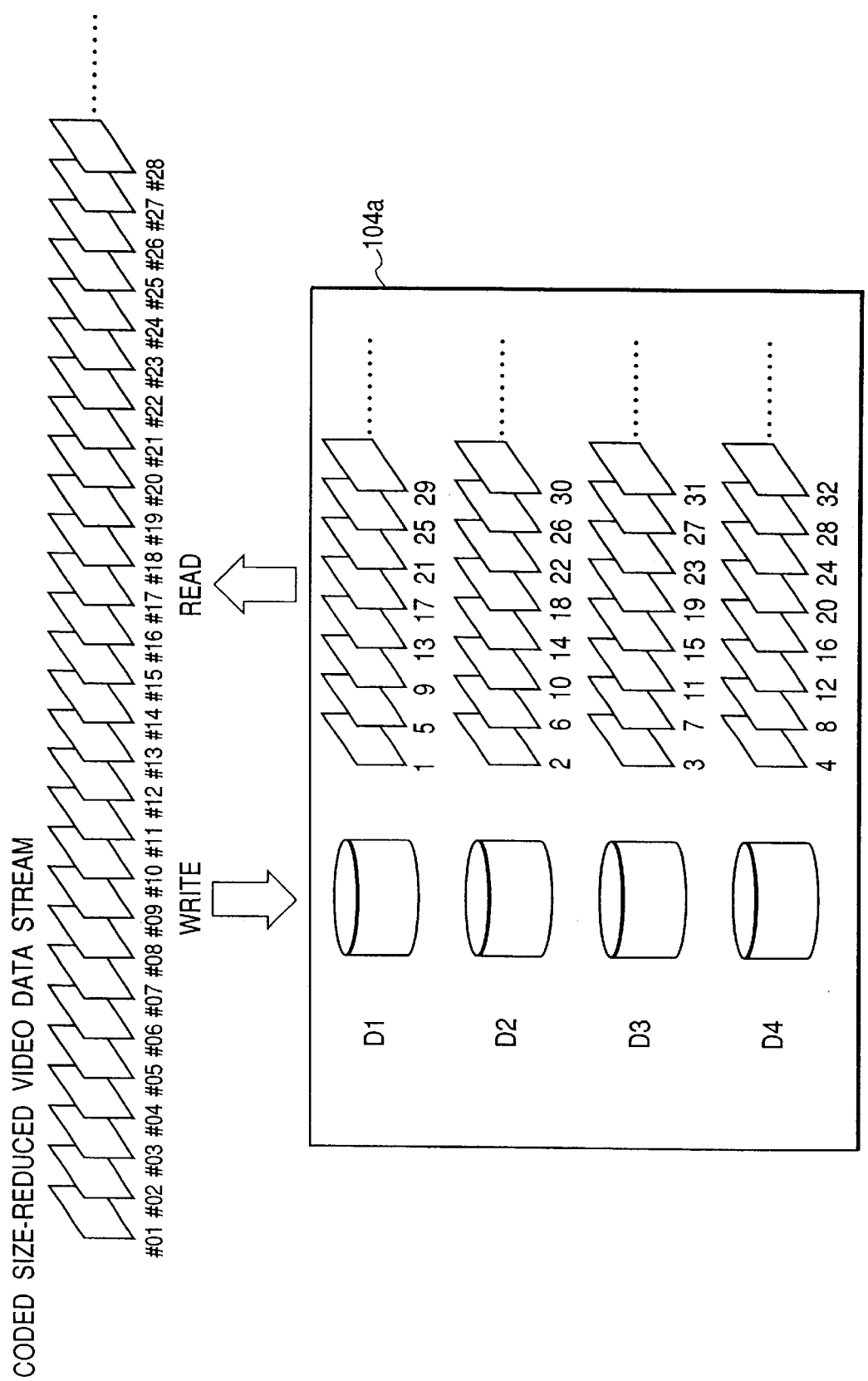
FIG. 18 is a diagram showing how the multiplexed coded size-reduced video data is distributed to and stored in a plurality of hard discs.

The above-described embodiments have used a single hard disc 104. However, the server 1- may be provided with a plurality (Nd) of hard discs 104a, e.g., 4 discs D1, D2, D3 and D4 as shown in FIG. 18. In this case, the video encoder 107 or 167 preferably stores the frames of a video Pi data in the following manner (the decimal numerals below indicate frame numbers).

D1: 1, 5, 9, 13, 17, ...
D2: 2, 6, 10, 14, 18, ...
D3: 3, 7, 11, 15, 19, ...
D4: 4, 8, 12, 16, 20, ...

Since each pack contains eight frames, packs stored in the disc D1 comprises following frames:

Pack D1/1: 1, 5, 9, 13, 17, 21, 25, 29
Pack D1/2: 33, 37, 41, 45, 49, 53, 57
Pack D1/3: 61, 65, 69, 73, 77, 81, 85

The packs D 1/1, 2, 3 ... are stored in the hard disc in order of D1/1, 2, 3 and so on.

The frame compiler logic 109 creates packs D1/1, D2/1, D3/1 and D4/1 from video data, slice information and padding data of the frame data from frames 1 to 32. The packs D1/1, D2/1, D3/1 and D4/1 are stored in respective hard discs D1, D2, D3 and D4. Packs D1/2, D2/2, D3/2 and D4/2 are created from frames 33 to 64 and stored in respective discs.

A read of a frame is achieved either by specifying a frame number or by specifying a pack number. If a frame number j is specified, then the hard disc D# storing the frame j is given as:

$$\#=(j \bmod Nd)$$

where # is a disc number, Nd is the number of discs (4 in this case), and (X mod Y) indicates the remainder which results from the division of j/Nd. The number of the pack containing the specified frame j is given as <j/(Nd*Nf)>, where Nf is the number of frames in a pack, and <A> is a minimum integer not smaller than A.

Doing this causes the load involved in the access to the hard disc 104 to be distributed in a plurality of hard discs.

Modification II

The above-described video DB system 1 is in a client-server configuration. However, a system embodying the invention may be in a stand-alone configuration.

Figure 19:
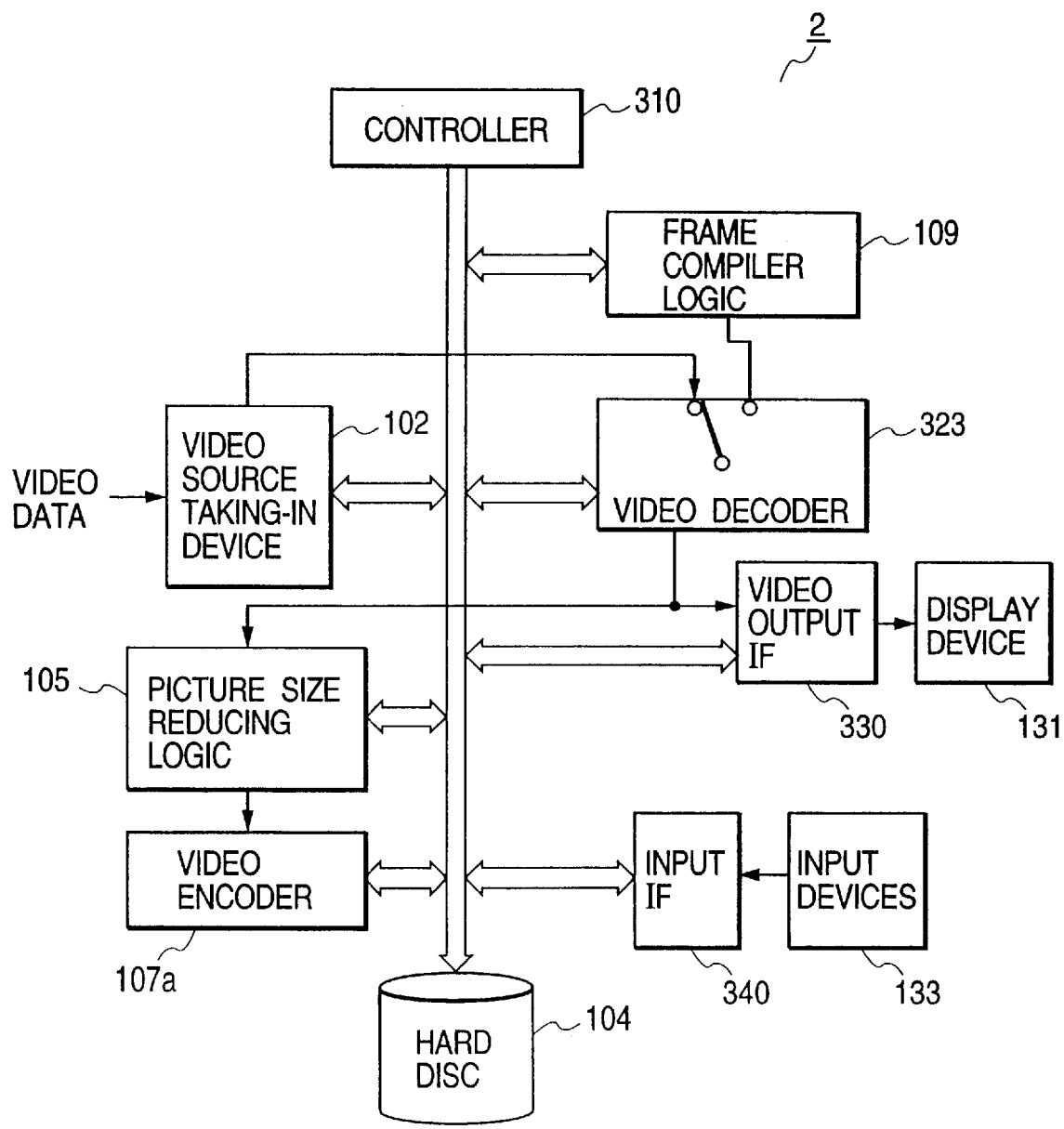
FIG. 19 is a schematic block diagram showing a stand-alone system that incorporates an illustrative embodiment of the invention.

FIG. 19 is a schematic block diagram showing a stand-alone system that incorporates an illustrative embodiment of the invention. In FIG. 19, the system 2 comprises:

the above-described video taking-in device 102;

the frame compiler logic 109 a video decoder 323 for decoding the taken-in coded video data into video pixel data and for decoding a compiled frame of size-reduced videos from the frame compiler logic 109;

the hard disc 104;

the picture size reducing logic 105;

a video encoder 107a for encoding the size-reduced video data from the picture size reducing logic 105 into a coded size-reduced video for display, which is then stored in the hard disc 103;

a video output IF 330 which has functions of above-mentioned DAC 125, the NTSC/PAL encoder 127 and a display interface;

a controller 310 for controlling the entire system 2;

an input user interface 340 for providing the controller 310 with an interface with the user; and the input devices 133.

Since the operation of the system 2 is the same as that of the system 1 except that the system 2 has no need of communication facility between the frame compiler logic 109 and the decoder 323, the description of system operation will be omitted.

Embodiment III

Figure 20:
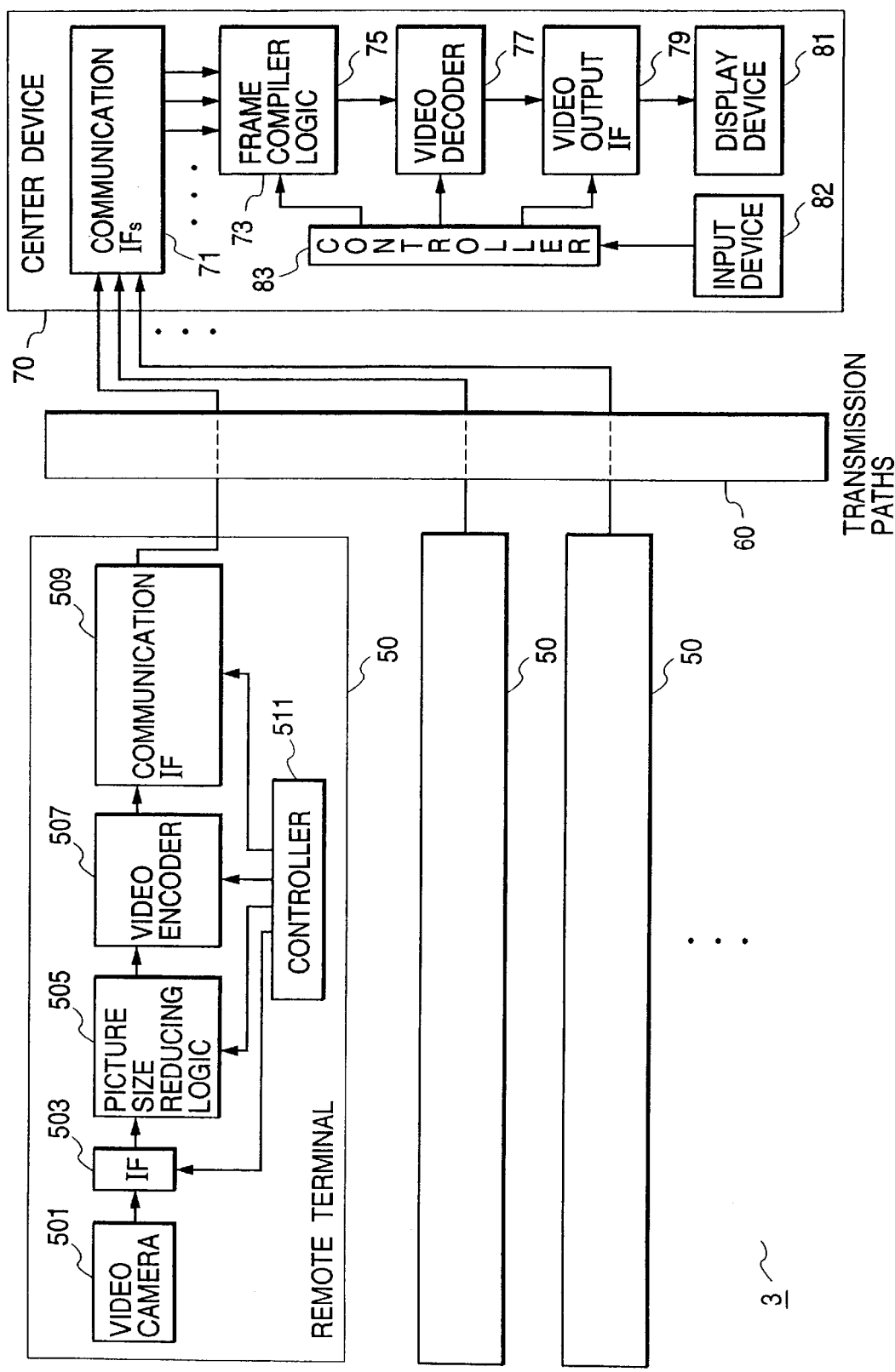
FIG. 20 is a schematic block diagram showing a remote monitoring system 3 that incorporates a third illustrative embodiment of the invention.

FIG. 20 is a schematic block diagram showing a remote monitoring system 3 that incorporates a third illustrative embodiment of the invention. In FIG. 20, the remote monitoring system 3 comprises a plurality of remote terminals 50 for transmitting a coded size-reduced version of video data, a center device 70 for collecting and displaying the coded size-reduced videos at a time, and transmission paths 60 for transmitting respective coded size-reduced videos.

Each of the remote terminal 50 comprises:

a video camera 501 for obtaining video frames;

a camera interface (IF) 503 having the input thereof connected with the camera 501;

a picture size reducing logic 505 for reducing the size of the video pixel data from the camera interface 503 into an appropriate size;

a video encoder 507 for encoding the size-reduced video data from the picture size reducing logic 505 into a coded size-reduced video for display;

a communication interface 509 for transmitting the coded size-reduced video to the center device 70; and a controller 511 for controlling the entire terminal 50.

The center device 70 comprises:

communication interfaces 71 for communicating with the remote terminals 50;

a frame compiler 75 for compiling a frame comprising an array of coded videos from desired ones of the coded size-reduced videos;

a video decoder 77 for decoding a frame of coded size-reduced videos from the compiler 75;

a video output IF 79 for converting the decoded frame for display;

a controller 83 for controlling the operation of the video decoder 123;

a display device 81 connected with the user IF 129 for displaying the frame of size-reduced videos; and input devices 82 such as a keyboard, a mouse, etc.

In operation of each remote terminal 50, a shot video frame is passed to the picture size reducing logic 505 via the camera IF 503. The picture size reducing logic 505 reduces the size of the video frame into a size specified the controller 511. The size-reduced picture is decoded by the video decoder 507 and transmitted to the center device 70 via corresponding transmission path.

In center device, the communication interfaces 71 associated with the remote terminal 50 receive the coded size-reduced pictures from respective remote terminals and passes the coded size-reduced pictures to the frame compiler logic 73, which compiles a display frame from the coded size-reduced pictures on the basis of the above-described output video map. Thereafter, the compiled frame is displayed in the same manner as in the above embodiments.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of displaying a plurality of specified ones of still and/or moving pictures in an array of windows provided on a display screen of a computer based system, the method comprising the steps of:

reducing in picture size said still and/or moving pictures into size-reduced pictures with a picture size of said windows;

coding said size-reduced pictures into coded size-reduced still and/or moving pictures, which each comprise a plurality of slices;

for each coded size-reduced picture, generating slice information which associates each slice of said each coded size-reduced picture with an offset and a length of the slice, said offset being a distance from the beginning of said each coded size-reduced still or moving picture;

storing said coded size-reduced pictures in a first area of a mass storage device and storing respective pieces of said slice information in a second area of said mass storage device;

in response to a reception of a predetermined signal and a list of said specified still and/or moving pictures, compiling a frame of picture comprising coded size-reduced pictures for said specified pictures by using said slice information; and decoding said compiled frame for display.

2. A method as defined in claim 1, further comprising the step of, in response to said list, generating and storing a map associating said specified pictures in said list with said windows, and wherein said compiling step comprises the step of arranging said coded size-reduced pictures in said array of frames according to said map.

3. A method as defined in claim 1, wherein said compiling step comprises the step of, in response to an absence of a picture for a window, providing a predetermined code to this effect and wherein said decoding step further comprises the step of, in response to said predetermined code, generating such data as cause nothing to be displayed in said window.

4. A method of displaying a plurality of specified ones of videos in an array of windows provided on a display screen of a computer based system, the method comprising the steps of:

reducing in picture size said videos into size-reduced videos with a picture size of said windows;

coding said size-reduced videos into coded size-reduced videos;

storing said coded size-reduced videos and respective frame rates in a mass storage device;

in response to a predetermined signal and a list of said specified videos, compiling a series of frames, by selecting, for each of said frames, optimal coded size-reduced pictures from said specified videos considering a predetermined display rate of said frames and said respective frame rates of said specified videos; and decoding said series of compiled frames for display.

5. A method as defined in claim 4, wherein said step of compiling a series of frames is achieved such that when said series of compiled frames are reproduced at said predetermined display rate, images are displayed in each of said windows at a rate substantially equal to an original rate of a video assigned to the window if said video assigned to the window is a moving picture.

6. A method as defined in claim 5, further comprising the step of setting said predetermined display rate of said series of frames equal to one of said frame rates for said respective videos.

7. A method of displaying a plurality of specified ones of videos (or moving pictures) in an array of windows provided on a display screen of a computer based system, the method comprising the steps of:

reducing in size said videos into size-reduced videos with a size of said windows;

coding said size-reduced videos into coded size-reduced videos each comprising N slices;

generating and storing slice information which associates each of said coded size-reduced videos with a length and a distance from the beginning of said each coded size-reduced video;

multiplexing said coded size-reduced videos and said slice information into a series of packs each comprising a video data part and a slice information part, said video data part comprising a first header including a first ID code and a predetermined number of frames of said each coded size-reduced video, said slice information part comprising a second header including a second ID code and slice information for said predetermined number of frames;

in response to a predetermined signal and a list of said specified videos, for each of said coded size-reduced videos, reading N said slices from said series of packs by using said slice information to compile a series of frames, each of said frames comprising coded size-reduced frames derived from respective specified videos; and decoding said series of compiled frames for display.

8. A method as defined in claim 7, wherein said multiplexing step includes the step of including, in each of said packs, a padding data part comprising said second header including said second ID code and a length of padding byte, said length being such that said packs become equal in length.

9. A method as defined in claim 7, further comprising the step of storing said series of packs in a plurality of mass storage devices such that said series of packs are uniformly distributed to said mass storage devices.

10. A system for displaying a plurality of specified ones of still and/or moving pictures in an array of windows provided on a display screen of a computer based system, the system comprising:

means for reducing in size said pictures into size-reduced pictures with a size of said windows;

means for coding said size-reduced pictures into coded size-reduced pictures, which each comprises a plurality of slices;

means for generating, for each coded size-reduced picture, slice information which associates each slice of said each coded size-reduced picture with an offset and a length of the slice, said offset being a distance from the beginning of said each coded size-reduced still or moving picture; means for storing said coded size-reduced pictures in a first area of a mass storage device and storing respective pieces of said slice information in a second area of said mass storage device;

means, responsive to a predetermined signal and a list of said specified still and/or moving pictures, for compiling a frame of picture comprising coded size-reduced pictures for said specified pictures by using said slice information; and means for decoding said compiled frame for display.

11. A system as defined in claim 10, further comprising means, responsive to said list, for generating and storing a map associating said specified pictures in said list with said windows, and wherein said compiling means comprises means for arranging said coded size-reduced pictures in said array of frames according to said map.

12. A system as defined in claim 10, wherein said compiling means comprises means, response to an absence of a picture for a window, for providing a predetermined code to this effect and wherein said decoding means further comprises means response to said predetermined code for generating such data as cause nothing to be displayed in said window.

13. A system for displaying a plurality of specified ones of videos in an array of windows provided on a display screen of a computer based system, the system comprising:

means for reducing in picture size said videos into size-reduced videos with a picture size of said windows;

means for coding said size-reduced videos into coded size-reduced videos;

means for storing said coded size-reduced videos and respective frame rates in a mass storage device;

means, responsive to a predetermined signal and a list of said specified videos, for compiling a series of frames by selecting, for each of said frames, optimal coded size-reduced pictures from said specified videos considering a predetermined display rate of said frames and said respective frame rates of said specified videos; and means for decoding said series of compiled frames for display.

14. A system as defined in claim 13, wherein said means for compiling a series of frames operates such that when said series of compiled frames are reproduced at said predetermined display rate, images are displayed in each of said windows at a rate substantially equal to an original rate of a video assigned to the window if said video assigned to the window is a moving picture.

15. A system as defined in claim 14, further comprising means for setting said predetermined display rate of said series of frames equal to one of said frame rates for said respective videos.

16. A system of displaying a plurality of specified ones of videos (or moving pictures) in an array of windows provided on a display screen of a computer based system, the system comprising:

means for reducing in size said videos into size-reduced videos with a size of said windows;

means for coding said size-reduced videos into coded size-reduced videos each comprising N slices;

means for generating and storing slice information which associates each of said coded size-reduced videos with a length and a distance from the beginning of said each coded size-reduced video;

means for multiplexing said coded size-reduced videos and said slice information into a series of packs each comprising a video data part and a slice information part, said video data part comprising a first header including a first ID code and a predetermined number of frames of said each coded size-reduced video, said slice information part comprising a second header including a second ID code and slice information for said predetermined number of frames;

means, responsive to a predetermined signal and a list of said specified videos and operative for each of said coded size-reduced videos, for reading N said slices from said series of packs by using said slice information to compile a series of frames, each of said frames comprising coded size-reduced frames derived from respective specified videos; and means for decoding said series of compiled frames for display.

17. A system as defined in claim 16, wherein said multiplexing means includes means for including, in each of said packs, a padding data part comprising said second header including said second ID code and a length of padding byte, said length being such that said packs become equal in length.

18. A system as defined in claim 16, further comprising means for storing said series of packs in a plurality of mass storage devices such that said series of packs are uniformly distributed to said mass storage devices.

19. A system as defined in claim 16, wherein said decoding means including means for decoding only data headed by said first ID code while neglecting data headed by said second ID code.

20. A server that enables a client terminal to display a plurality of specified ones of still and/or moving pictures in an array of windows provided on a display screen of said client terminal, the server comprising:

means for reducing in size said pictures into size-reduced still and/or moving pictures with a size of said windows;

means for coding said size-reduced pictures into coded size-reduced still and/or moving pictures each comprising a plurality of slices;

means for generating, for each coded size-reduced still or moving picture, slice information which associates each slice of said each coded size-reduced still or moving picture with an offset and a length of the slice, said offset being a distance from the beginning of said each coded size-reduced still or moving picture;

means for storing said coded size-reduced still and/or moving pictures in a first area of a mess storage device and storing respective pieces of said slice information in a second area of said mass storage device;

means, responsive to a predetermined signal and a list of said specified still and/or moving pictures, for compiling a frame comprising coded size-reduced pictures for said specified pictures by using pieces of said slice information for said specified pictures; and means for transmitting said compiled frame to said client terminal.

21. A video database server that enables a client terminal to display a plurality of retrieved ones of stored videos in an array of windows provided on a display screen of the client terminal, the server comprising:

means for reducing in size said pictures into size-reduced pictures with a size of said windows;

means for coding said size-reduced pictures into coded size-reduced pictures each comprising a plurality of slices;

means for generating, for each coded size-reduced picture, slice information which associates each slice of said each coded size-reduced picture with an offset and a length of the slice, said offset being a distance from the beginning of said each coded size-reduced picture;

means for storing said coded size-reduced pictures in a first area of a mass storage device and storing respective pieces of said slice information in a second area of said mass storage device;

means, responsive to a reception of a request from a requesting client terminal, for providing a predetermined signal and a list of retrieved pictures;

means, responsive to said predetermined signal and said list of retrieved pictures, for compiling a frame comprising coded size-reduced pictures for said retrieved pictures in said list by using pieces of said slice information for said retrieved pictures; and means for transmitting said compiled frame to said requesting client terminal.

22. A remote monitoring system comprising:

a plurality of remote terminals; and a center device for collecting video data from said remote terminals and display said collected videos in an array of windows provided on a display screen, wherein each remote terminal comprises:

a video camera for providing a shot video;

means for reducing in size said video into size-reduced video with a size of said windows;

means for coding said size-reduced video into a coded size-reduced video comprising a plurality of slices;

means for generating slice information which associates each slice of said coded size-reduced video with an offset and a length of the slice, said offset being a distance from the beginning of said coded size-reduced video; and means for communicating said coded size-reduced video and said slice information separately to said center device, and wherein said center device comprises:

means for receiving said coded size-reduced video and said slice information from each remote terminal means for compiling a frame comprising said received coded size-reduced videos from said remote terminals by using respective pieces of said slice information; and means for decoding said compiled frame for display.

* * * * *